United States Patent
Brask

(10) Patent No.: US 6,861,005 B2
(45) Date of Patent: Mar. 1, 2005

(54) GENERATING NITRIDE WAVEGUIDES

(75) Inventor: Justin K. Brask, Portland, OR (US)

(73) Assignee: Intel Corporation, Santa Clara, CA (US)

(*) Notice: Subject to any disclaimer, the term of this patent is extended or adjusted under 35 U.S.C. 154(b) by 267 days.

(21) Appl. No.: 10/209,843

(22) Filed: Jul. 31, 2002

(65) Prior Publication Data

US 2004/0020895 A1 Feb. 5, 2004

(51) Int. Cl.$^7$ .............................................. H01L 21/302
(52) U.S. Cl. ........................... 216/2; 216/39; 216/90; 438/31; 438/745; 438/747
(58) Field of Search ....................... 216/2, 39, 90, 216/95; 438/31, 745, 747

(56) References Cited

U.S. PATENT DOCUMENTS

| | | | | |
|---|---|---|---|---|
| 6,060,388 A | * | 5/2000 | Akatsu et al. | 438/637 |
| 6,613,648 B1 | * | 9/2003 | Lim et al. | 438/424 |
| 6,740,595 B2 | * | 5/2004 | Kudelka et al. | 438/704 |

* cited by examiner

*Primary Examiner*—George A. Goudreau
(74) *Attorney, Agent, or Firm*—Trop, Pruner & Hu, P.C.

(57) ABSTRACT

Polysilicon formed over an underlying insulator may be highly selectively etched. Therefore, polysilicon may be selectively etched using tetraalkylammonium hydroxide or $NH_4OH$ to define a nitride waveguide. The resulting nitride waveguide may have smoother surfaces resulting in less loss of light intensity as light travels through the nitride waveguide.

15 Claims, 2 Drawing Sheets

GENERATING NITRIDE WAVEGUIDES

BACKGROUND

This invention relates generally to forming nitride waveguides.

Nitride waveguides may be utilized to communicate information in the form of light signals between a transmitter and a receiver. For example, two integrated circuits on the same circuit board may be coupled through a nitride waveguide to communicate with one another.

The existing nitride waveguides have suffered diminution of intensity due to the irregular configuration of the nitride waveguide. The irregular configuration of the nitride waveguide and, primarily, its sidewalls is largely due to the techniques used to form the waveguide. Conventional etching techniques result in a fairly rough exterior surface of the resulting nitride waveguide.

The effect of the rough exterior surface of the nitride waveguide is to cause losses in the course of transmitting light information through the waveguide. As light propagates along existing waveguides, light is scattered and refracted out of the waveguide, diminishing the intensity of the light that exits the waveguide.

Thus, there is a need for ways to reduce the loss of light intensity as light propagates through nitride waveguides.

DETAILED DESCRIPTION

Referring to FIGS. 1 through 4, a nitride waveguide with reduced line edge roughness may be prepared in one embodiment of the present invention using highly selective polysilicon etching. The resulting structures may exhibit reduced light loss, for example, for use in connection with optical interconnects.

Figure 1:
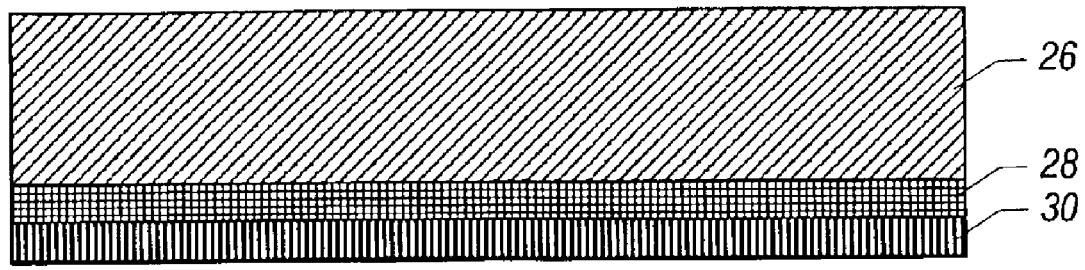
FIG. 1 is an enlarged cross-sectional view of one embodiment of the present invention.
Figure 2:
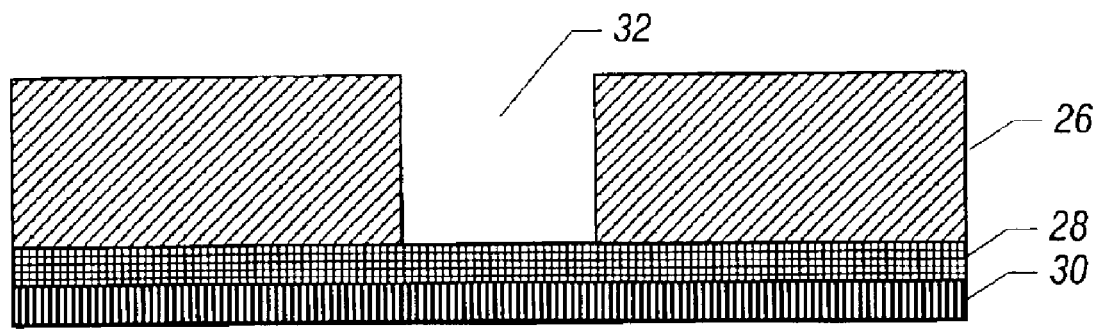
FIG. 2 is an enlarged cross-sectional view after further processing in accordance with one embodiment of the present invention.

Referring to FIG. 1, a structure may include a silicon substrate 30 covered by a dielectric layer 28, in turn covered by polysilicon 26 in accordance with one embodiment of the present invention. The layer 28 may be any dielectric including oxide. An opening 32 may be patterned in the polysilicon 26 without adversely affecting the underlying dielectric 28. The etch utilized to remove polysilicon 26 to form the opening 32, as shown in FIG. 2, may be any conventional etch, such as a dry etch with a lithographically patterned photoresist layer on top of the polysilicon 26.

Figure 3:
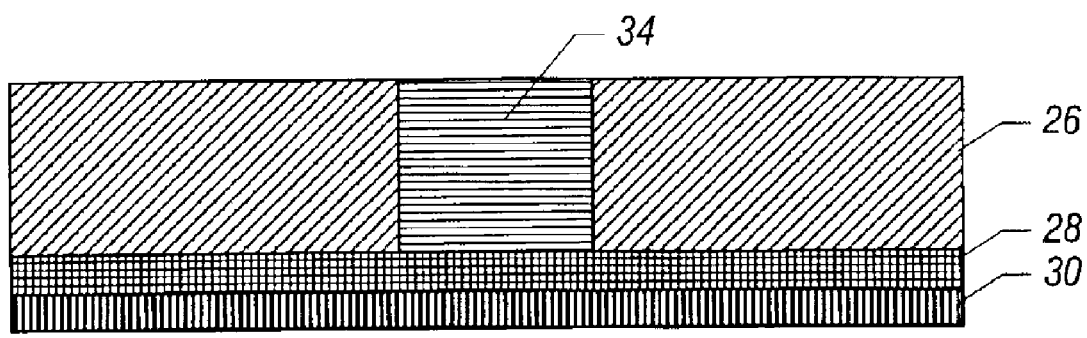
FIG. 3 is an enlarged cross-sectional view after further processing in accordance with one embodiment of the present invention.
Figure 4:
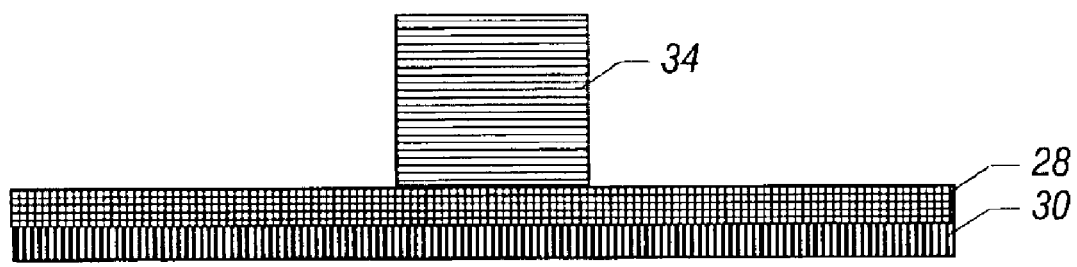
FIG. 4 is an enlarged cross-sectional view after further processing in accordance with one embodiment of the present invention.

Thereafter, the opening 32 may be filled with a nitride material 34 as shown in FIG. 3. A polishing step may be utilized to polish the nitride 34 back to the surface of the polysilicon 26. After the formation of the nitride material 34, the surrounding polysilicon 26 may be removed, as shown in FIG. 4, using a highly selective etch such as tetraalkylammonium hydroxide or an $NH_4OH$ etch. For example, the tetraalkylammonium hydroxide may be tetramethylammonium hydroxide or tetraethylammonium hydroxide, as two examples. In some embodiments, a 25 percent solution of tetramethylammonium hydroxide may be used.

In other embodiments $NH_4OH$ at 24° C., together with sonic energy, may be utilized. Thus, a room temperature etching process may be utilized with ultrasonic or megasonic energy.

Hydroxide-based etches of silicon are normally done at high temperatures which reduces the selectivity of silicon versus nitride and/or underlying dielectric. At low temperatures the $NH_4OH$ is ineffective because hydrogen gas bubble formation at the structure being etched generates a protective silicon-hydrogen coating that shuts down the etch. However, by sonicating the chemical bath, H2 bubble formation may be reduced or eliminated, dissipating the H2 into solution upon formation allowing completion of the etch.

The selective etch does not attack the nitride which will become the waveguide or the underlying dielectric layer 28.

In some embodiments a dry etch may be utilized to pattern the polysilicon and a highly selective wet etch may be utilized to remove the polysilicon. A waveguide formed of nitride may be created with nearly orthogonal edges and smooth walls, as shown in FIG. 4, in some embodiments of the present invention.

Figure 5:
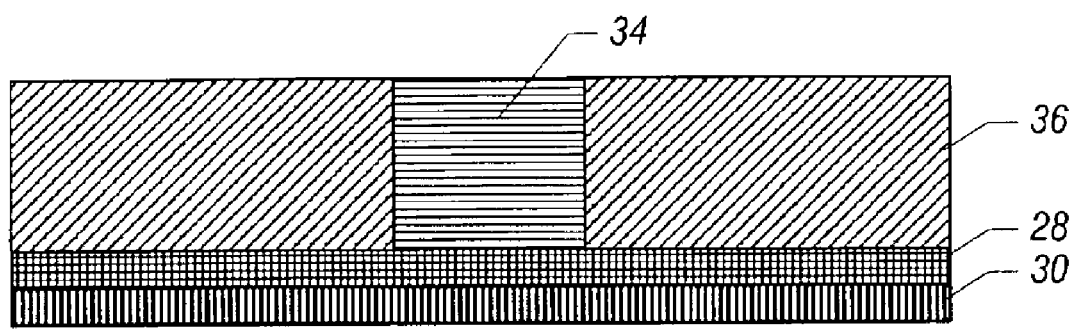
FIG. 5 is an enlarged cross-sectional view after further processing in accordance with one embodiment of the present invention.

Referring to FIG. 5, a final optically compatible encapsulation layer 36 may be completed using an interlayer dielectric material 36. The layer 36 may be deposited, for example, and the structure may be polished to form the smooth upper surface shown in FIG. 5. By using sacrificial polysilicon to define the sidewalls of the nitride waveguide 34, the dry etch/patterning of polysilicon is smoother and more consistent. Therefore, when the nitride is deposited and subsequently polished back to the desired level, the resulting nitride structure may have smoother sidewalls, leading to reduced scattering compared to patterning a nitride layer directly with a dry etch or negatively patterning an insulating material into which the nitride is deposited.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

forming a structure with polysilicon over an insulator;

selectively etching an opening in the polysilicon with respect to the underlying insulator;

filling the etched opening with nitride; and etching said polysilicon away from said nitride using an etching solution selected from the group comprising $NH_4OH$ and tetraalkylammonium hydroxide.

2. The method of claim 1 including forming a nitride waveguide.

3. The method of claim 2 including polishing the nitride in the opening back to the surface of the polysilicon.

4. The method of claim 3 including removing the remaining polysilicon.

5. The method of claim 4 including removing the remaining polysilicon using an etching solution selected from the group consisting of $NH_4OH$ and tetraalkylammonium hydroxide.

6. A method comprising:

forming a layer of polysilicon over an insulator;

forming an opening in said polysilicon layer;

filling said opening with nitride to define a nitride waveguide; and etching the polysilicon away from the regions surrounding said nitride waveguide using an etching solution selected from the group comprising $NH_4OH$ and tetraalkylammonium hydroxide.

7. The method of claim 6 including using $NH_4OH$ to etch said polysilicon.

8. The method of claim 7 including using sonic energy to etch said polysilicon.

9. The method of claim 6 including using tetramethylammonium hydroxide to etch said polysilicon.

10. The method of claim 9 including using a 25 percent solution of tetramethylammonium hydroxide.

11. A method comprising:

forming a structure with polysilicon over an insulator;

selectively etching an opening in the polysilicon with respect to the underlying insulator;

filling the etched opening with nitride;

etching the polysilicon away from the regions surrounding said nitride using an etching solution selected from the group comprising $NH_4OH$ and tetraalklyammonium hydroxide; and encapsulating said nitride in a dielectric layer.

12. The method of claim 11 including using tetramethylammonium hydroxide to etch said polysilicon.

13. The method of claim 12 including using a 25 percent solution of tetramethylammonium hydroxide.

14. The method of claim 11 including using $NH_4OH$ plus sonic energy to etch said nitride.

15. The method of claim 11 including polishing the nitride back to the surface of said polysilicon and then etching the polysilicon away from the region surrounding the nitride.

* * * * *